(12) United States Patent
Balaram et al.

(10) Patent No.: US 11,552,339 B2
(45) Date of Patent: Jan. 10, 2023

(54) BATTERY PACK WITH OVERMOLDED MODULE

(71) Applicant: Apple Inc., Cupertino, CA (US)

(72) Inventors: Haran Balaram, Sunnyvale, CA (US); Nathan J. Bohney, Campbell, CA (US); Jonathan C. Wilson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 102 days.

(21) Appl. No.: 16/880,076

(22) Filed: May 21, 2020

(65) Prior Publication Data

US 2020/0381783 A1 Dec. 3, 2020

Related U.S. Application Data

(60) Provisional application No. 62/854,518, filed on May 30, 2019.

(51) Int. Cl.
*H01M 10/42* (2006.01)
*H01M 50/50* (2021.01)

(52) U.S. Cl.
CPC ....... *H01M 10/4257* (2013.01); *H01M 50/50* (2021.01); *H01M 2010/4271* (2013.01)

(58) Field of Classification Search
CPC ............. H01M 10/42; H01M 10/4257; H01M 10/425; H01M 50/50; H01M 50/55; H01M 50/54; H01M 50/543; H01M 50/264; H01M 50/267; H01M 50/284; H01M 50/287; H01M 50/289; H01M 50/296; H01M 50/298

See application file for complete search history.

(56) References Cited

U.S. PATENT DOCUMENTS

2020/0014001 A1* 1/2020 Yang ................... H01M 50/209

FOREIGN PATENT DOCUMENTS

WO    WO-2018186604 A1 * 10/2018    .......... H01M 50/284

* cited by examiner

*Primary Examiner* — Karie O'neill Apicella
(74) *Attorney, Agent, or Firm* — Kilpatrick Townsend & Stockton (57) ABSTRACT

Battery systems according to embodiments of the present technology may include a battery including a first electrode terminal and a second electrode terminal accessible along a first surface of the battery. The battery systems may also include a module electrically coupled with the battery. The module may include a first mold extending toward the battery. The first mold may define a recess along a first surface of the first mold proximate the first electrode terminal and the second electrode terminal. The module may include a first conductive tab electrically coupling the module with the first electrode terminal. The first electrode terminal may be at least partially positioned within a space defined by the recess defined by the first mold. The module may also include a second conductive tab electrically coupling the module with the second electrode terminal.

19 Claims, 5 Drawing Sheets

BATTERY PACK WITH OVERMOLDED MODULE

CROSS-REFERENCES TO RELATED APPLICATIONS

The present application claims the benefit of priority to U.S. Provisional Application No. 62/854,518, filed May 30, 2019, the contents of which are hereby incorporated by reference in their entirety for all purposes.

TECHNICAL FIELD

The present technology relates to battery systems. More specifically, the present technology relates to battery component configurations incorporating a module with a battery.

BACKGROUND

Batteries are used in many devices. As devices in which batteries are housed reduce in size, the available space for battery cells and associated system materials may limit placement options.

SUMMARY

Battery systems according to embodiments of the present technology may include a battery including a first electrode terminal and a second electrode terminal accessible along a first surface of the battery. The battery systems may also include a module electrically coupled with the battery. The module may include a first mold extending toward the battery. The first mold may define a recess along a first surface of the first mold proximate the first electrode terminal and the second electrode terminal. The module may include a first conductive tab electrically coupling the module with the first electrode terminal. The first electrode terminal may be at least partially positioned within a space defined by the recess defined by the first mold. The module may also include a second conductive tab electrically coupling the module with the second electrode terminal.

In some embodiments, the battery further may include a port positioned proximate a lateral edge of the first surface of the battery. The first mold may define a recessed ledge in the first surface of the first mold extending towards a lateral edge of the first mold proximate the port. The systems may also include a first adhesive positioned between the port and the first mold. The first adhesive may extend across the recessed ledge. The second conductive tab may at least partially define a volume between a first end of the second conductive tab coupled with the module and a second end of the second conductive tab coupled with the second electrode terminal. The systems may also include a spacer including a second adhesive seated in the volume between the first end of the second conductive tab and the second end of the second conductive tab.

The systems may also include a circuit board having a first surface with which the first mold is coupled along a second surface of the first mold opposite the first surface of the first mold. An electronic device may extend from a second surface of the circuit board opposite the first surface of the circuit board. The module may also include a second mold coupled with the second surface of the circuit board. The second mold may encapsulate the electronic device. The circuit board may extend substantially parallel to the first surface of the battery to a location substantially in line with a flange of a second surface of the battery normal to the first surface of the battery. The second mold may extend along the circuit board to an edge of the circuit board proximate the flange. The first mold may extend along the circuit board to a position offset from the edge of the circuit board in a direction parallel to the first surface of the battery. The systems may also include a flexible coupling extending from the module and including a board-to-board connector at a distal end of the flexible coupling.

Some embodiments of the present technology may also encompass battery systems including a battery characterized by a first surface, a second surface, and a third surface. The second surface and the third surface may be substantially parallel to one another. The first surface of the battery may extend between the second surface and the third surface. The first surface may include a first electrode terminal and a second electrode terminal. The systems may include a module coupled with the first surface of the battery and including a circuit board characterized by a first surface and a second surface opposite the first surface. The module may include a first mold extending from the first surface of the circuit board toward the battery. The module may include a second mold extending from the second surface of the circuit board. The module may include a first conductive tab extending from the module to the first electrode terminal. The module may include a second conductive tab extending from the module to the second electrode terminal. The module may also include a flexible coupling extending from the circuit board parallel to the first surface of the battery in a direction towards the second surface of the battery.

In some embodiments, the first mold may define a recess along a first surface of the first mold proximate the first electrode terminal. The first surface of the first mold may be opposite a second surface of the first mold coupled with the first surface of the circuit board. The first electrode terminal of the battery may extend from the first surface of the battery. The first electrode terminal may at least partially be positioned within the recess defined by the first mold. The second conductive tab may at least partially define a volume between a first end of the second conductive tab coupled with the module and a second end of the second conductive tab coupled with the second electrode terminal. The battery system may also include a spacer including an adhesive seated in the volume between the first end of the second conductive tab and the second end of the second conductive tab. The second surface of the battery may include a flange extending proud of an intersection of the first surface of the battery and the second surface of the battery. The circuit board of the module may extend substantially parallel to the first surface of the battery to a location substantially in line with the flange.

The second mold may extend along the second surface of the circuit board to an edge of the circuit board proximate the flange. The first mold may extend along the circuit board to a position offset from the edge of the circuit board in a direction parallel to the first surface of the battery. The first mold may extend towards the first surface of the battery beyond a plane parallel to the first surface of the battery and defined by an external edge of the flange. The second mold may define a chamfer along an outer edge of the second mold at a location along the second mold proximate the first electrode terminal of the battery. The battery may define an arcuate indentation along an intersection of the first surface of the battery and the third surface of the battery. The flexible coupling may include a connector at a distal end of the flexible coupling. The flexible coupling may be folded about the second mold to position the connector at least partially between the module and the third surface of the battery in a direction along the first surface of the battery. The battery may also include a port positioned proximate a lateral edge of the first surface of the battery. The first mold may define a recessed ledge in a first surface of the first mold extending towards a lateral edge of the first mold proximate the port. The module may also include a first adhesive positioned between the port and the first mold. The first adhesive may extend across the recessed ledge of the first mold.

Some embodiments of the present technology may also encompass battery systems including a battery. The battery may include a first electrode terminal, a second electrode terminal, and a port accessible along a first surface of the battery. The systems may include a module electrically coupled with the battery. The module may include a mold extending toward the battery. The mold may define a recessed ledge in a first surface of the mold extending towards a lateral edge of the mold proximate the port. The module may include a first conductive tab electrically coupling the module with the first electrode terminal. The module may include a second conductive tab electrically coupling the module with the second electrode terminal. The second conductive tab may at least partially define a volume between a first end of the second conductive tab coupled with the module and a second end of the second conductive tab coupled with the second electrode terminal. The module may include a flexible coupling extending from the module parallel to the first surface of the battery. The system may include a first adhesive positioned between the port and the mold. The first adhesive may extend across the recessed ledge of the mold. The system may also include a spacer including a second adhesive seated in the volume between the first end of the second conductive tab and the second end of the second conductive tab.

Such technology may provide numerous benefits over conventional technology. For example, the present systems may provide a compact positioning of battery system components with a battery. Additionally, the battery system components may be positioned to accommodate a defined volume and geometry of a battery. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale or proportion unless specifically stated to be of scale or proportion. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, are used in a host of different systems. In many devices, the battery cells may be designed with a balance of characteristics in mind. For example, including larger batteries may provide increased usage between charges, however, the larger batteries may require larger housing, or increased space within the device. As device designs and configurations change, especially in efforts to reduce device sizes, the available space for additional battery system components may be constrained. These constraints may include restrictions in available volume as well as the geometry of such a volume. Conventional devices have often been restricted to larger form factors to accommodate both a sufficient battery as well as associated battery system components. The present technology may overcome these issues, however, by providing a configuration by which battery control system components may be confined to a volume accommodating the battery or a battery system in one or more ways. After illustrating an exemplary cell that may be used in embodiments of the present technology, the present disclosure will describe battery system designs having a controlled form factor for use in a variety of devices in which battery cells may be used.

Although the remaining portions of the description will reference lithium-ion batteries, it will be readily understood by the skilled artisan that the technology is not so limited. The present techniques may be employed with any number of battery or energy storage devices, including other rechargeable and primary battery types, as well as secondary batteries, or electrochemical capacitors. Moreover, the present technology may be applicable to batteries and energy storage devices used in any number of technologies that may include, without limitation, phones and mobile devices, watches, glasses, bracelets, anklets, and other wearable technology including fitness devices, handheld electronic devices, laptops and other computers, as well as other devices that may benefit from the use of the variously described battery technology.

Figure 1:
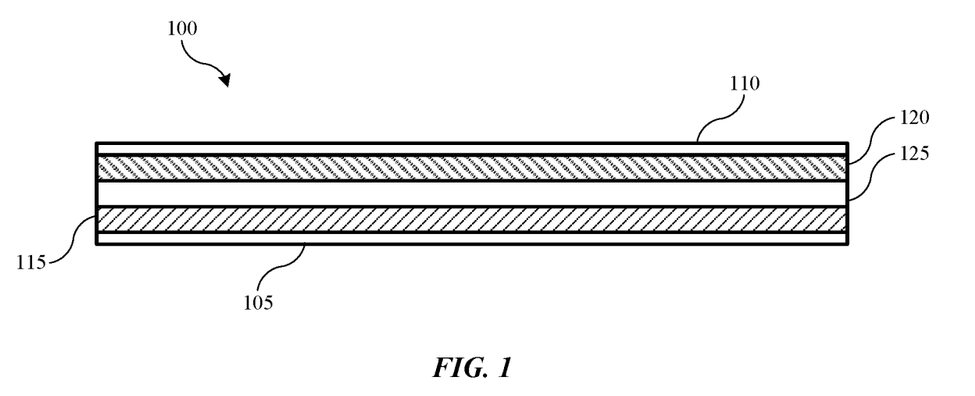
FIG. 1 shows a schematic cross-sectional view of a battery cell according to some embodiments of the present technology.

FIG. 1 depicts a schematic cross-sectional view of an energy storage device or battery cell 100 according to embodiments of the present technology. Battery cell 100 may be or include a battery cell, and may be one of a number of cells coupled together to form a battery structure. As would be readily understood, the layers are not shown at any particular scale, and are intended merely to show the possible layers of cell material of one or more cells that may be incorporated into an energy storage device. In some embodiments, as shown in FIG. 1, battery cell 100 includes a first current collector 105 and a second current collector 110. In embodiments one or both of the current collectors may include a metal or a non-metal material, such as a polymer or composite that may include a conductive material. The first current collector 105 and second current collector 110 may be different materials in embodiments. For example, in some embodiments the first current collector 105 may be a material selected based on the potential of an anode active material 115, and may be or include copper, stainless steel, or any other suitable metal, as well as a non-metal material including a polymer. The second current collector 110 may be a material selected based on the potential of a cathode active material 120, and may be or include aluminum, stainless steel, or other suitable metals, as well as a non-metal material including a polymer. In other words, the materials for the first and second current collectors can be selected based on electrochemical compatibility with the anode and cathode active materials used, and may be any material known to be compatible.

In some instances the metals or non-metals used in the first and second current collectors may be the same or different. The materials selected for the anode and cathode active materials may be any suitable battery materials operable in rechargeable as well as primary battery designs. For example, the anode active material 115 may be silicon, graphite, carbon, a tin alloy, lithium metal, a lithium-containing material, such as lithium titanium oxide (LTO), or other suitable materials that can form an anode in a battery cell. Additionally, for example, the cathode active material 120 may be a lithium-containing material. In some embodiments, the lithium-containing material may be a lithium metal oxide, such as lithium cobalt oxide, lithium manganese oxide, lithium nickel manganese cobalt oxide, lithium nickel cobalt aluminum oxide, or lithium titanate, while in other embodiments the lithium-containing material can be a lithium iron phosphate, or other suitable materials that can form a cathode in a battery cell.

The first and second current collectors as well as the active materials may have any suitable thickness. A separator 125 may be disposed between the electrodes, and may be a polymer film or a material that may allow lithium ions to pass through the structure while not otherwise conducting electricity. Active materials 115 and 120 may additionally include an amount of electrolyte in a completed cell configuration. The electrolyte may be a liquid including one or more salt compounds that have been dissolved in one or more solvents. The salt compounds may include lithium-containing salt compounds in embodiments, and may include one or more lithium salts including, for example, lithium compounds incorporating one or more halogen elements such as fluorine or chlorine, as well as other non-metal elements such as phosphorus, and semimetal elements including boron, for example.

In some embodiments, the salts may include any lithium-containing material that may be soluble in organic solvents. The solvents included with the lithium-containing salt may be organic solvents, and may include one or more carbonates. For example, the solvents may include one or more carbonates including propylene carbonate, ethylene carbonate, ethyl methyl carbonate, dimethyl carbonate, diethyl carbonate, and fluoroethylene carbonate. Combinations of solvents may be included, and may include for example, propylene carbonate and ethyl methyl carbonate as an exemplary combination. Any other solvent may be included that may enable dissolving the lithium-containing salt or salts as well as other electrolyte component, for example, or may provide useful ionic conductivities, such as greater than or about 5-10 mS/cm.

Although illustrated as single layers of electrode material, battery cell 100 may be any number of layers. Although the cell may be composed of one layer each of anode and cathode material as sheets, the layers may also be formed into a jelly roll design, or folded design, prismatic design, or any form such that any number of layers may be included in battery cell 100. For embodiments which include multiple layers, tab portions of each anode current collector may be coupled together, as may be tab portions of each cathode current collector. Once the cell has been formed, a pouch, housing, or enclosure may be formed about the cell to contain electrolyte and other materials within the cell structure, as will be described below. Terminals may extend from the enclosure to allow electrical coupling of the cell for use in devices, including an anode and cathode terminal. The coupling may be directly connected with a load that may utilize the power, and in some embodiments the battery cell may be coupled with a control module that may monitor and control charging and discharging of the battery cell. FIG. 1 is included as an exemplary cell that may be incorporated in battery systems according to the present technology. It is to be understood, however, that any number of battery and battery cell designs and materials that may include charging and discharging capabilities similarly may be encompassed by the present technology.

Figure 2:
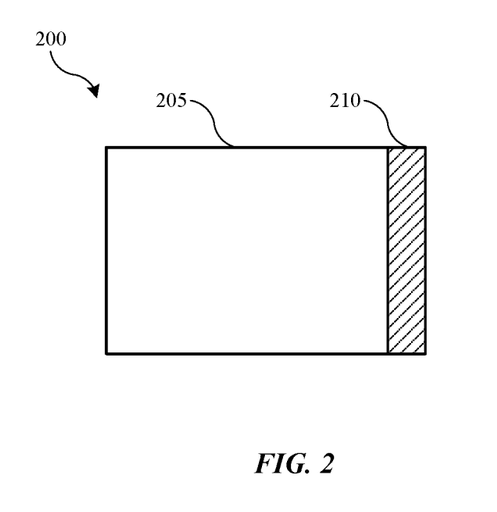
FIG. 2 shows a schematic plan view of a battery system according to some embodiments of the present technology.

FIG. 2 shows a schematic plan view of a battery system 200 according to some embodiments of the present technology. As illustrated, battery system 200 may include a battery cell or battery 205, which may include any number of battery cells, as well as a battery module 210. Battery module 210 may be electrically connected with battery 205 to provide a variety of functionality. For example, battery module 210 may monitor battery 205 during charging and discharging operations, and may ensure the battery is not overcharged or over-depleted during use. Additionally, battery module 210 may monitor overall health of the battery 205 to ensure proper functioning. Battery module 210 may couple with terminals of the battery, such as one or both of the positive and negative terminals, in order to provide this functionality.

Battery module 210 may also include an additional electrical connector, such as a coupling, that may allow device components to access the battery capacity through the battery module 210. In this way, battery module 210 may provide a pass-through functionality for delivering power from battery 205. Consequently, battery module 210 may be under constant load from the battery. Battery 205 may include a battery cell, which may be similar to battery cell 100 described above, and may include a pouch or enclosure to protect the battery cell from exposure to the environment. The housing may also operate to maintain electrolyte and other materials within the battery cell. To access the battery cell through this housing, one or more terminals or leads may extend through the housing. Some conventional designs may wrap the battery module 210 onto the terminals of battery 205, which may allow the provision of additional materials to protect terminals and conductive components from fluid contact. However, as device configurations continue to shrink, battery designs change, and manufacturing processes incorporate many more small scale operations with smaller and/or thinner materials, these types of incorporations may become less feasible or prone to causing damage. The present technology allows for an adjacent coupling of the battery module 210 onto terminals of the battery 205, which may further reduce the overall battery system envelope when incorporated within an electronic device.

Figure 3:
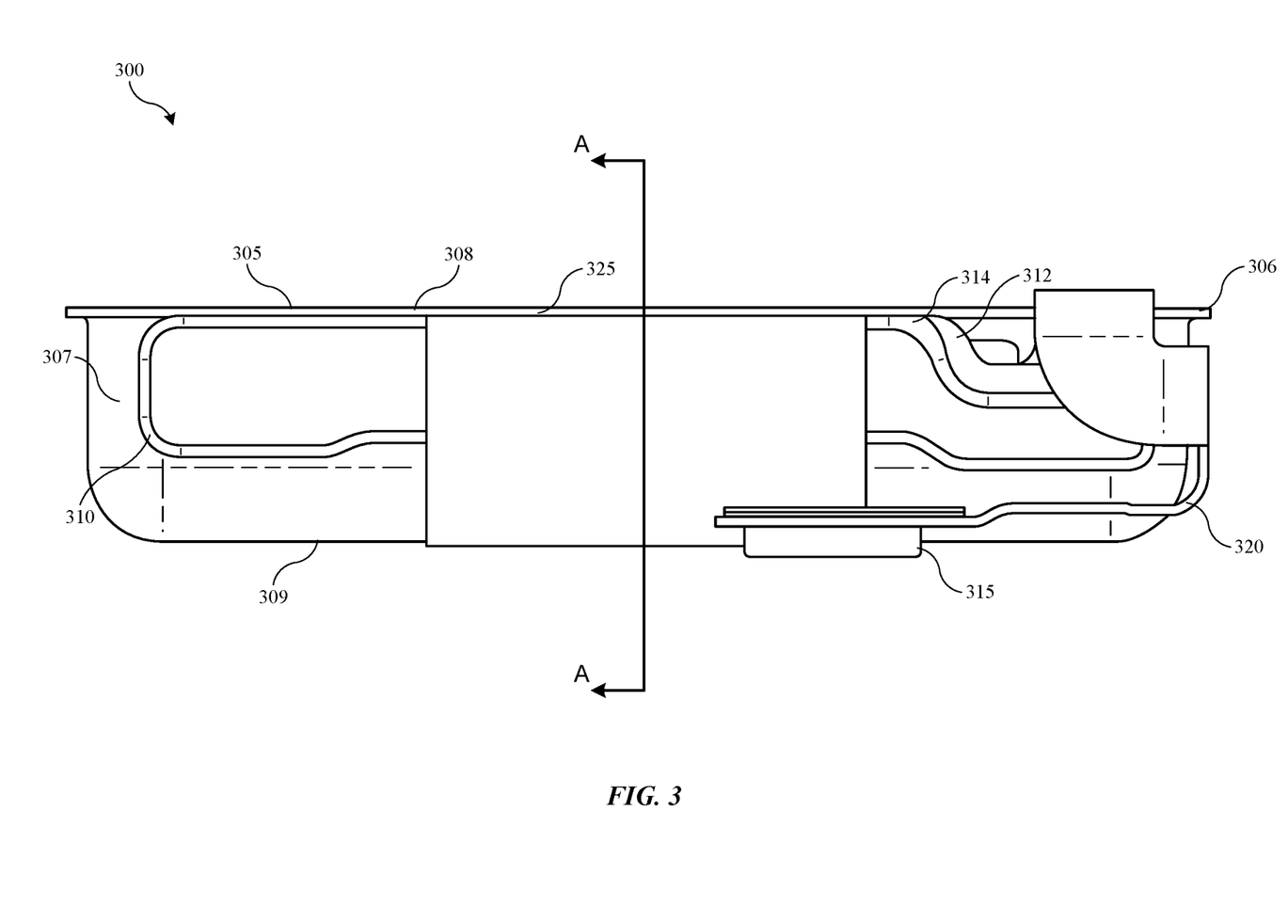
FIG. 3 shows a schematic elevation view of a battery system according to some embodiments of the present technology.

FIG. 3 shows a schematic cross-sectional view of a battery system 300 according to embodiments of the present technology. Battery system 300 may include any of the components previously described, and may include a battery 305, and a module 310. Battery 305 may include a battery cell as previously described in FIG. 1, and may include one or more cells included within a pouch or packaging. For example, in some embodiments battery 305 may include a rigid housing, and may include a conductive housing. The conductive housing may be maintained at positive or negative potential in embodiments, and may be maintained at negative potential, which may then operate as a device ground, and be considered similar to a neutral connection. Additionally, by using a rigid housing instead of a flexible pouch, fabrication tolerances on the battery dimensions may be reduced, which may afford increased volume for the internal battery cells, which may provide increased capacity over conventional designs. The rigid housing or can may include a flange 306 extending about the battery 305, which may be a lid enclosure for the rest of the housing, and which may be or include a seamless or substantially seamless form providing an internal volume in which the battery cell or cells and electrolyte may be contained.

Module 310 may monitor and manage aspects of battery 305 operation, and may be a power control module in embodiments. Module 310 may electrically couple with electrode terminals of the battery 305, and may transfer power through connector 315, which may be any type of connector, such as a board-to-board connector, for example. In some embodiments, module 310 may not extend beyond the lateral dimensions of battery 305, and may be maintained within a width of the battery 305. The connector 315 may be part of a coupling 320, which may be a flexible coupling extending from the module 310. For example, connector 315 may be at or near a distal end of the coupling 320. Coupling 320 may partially extend beyond a lateral dimension of the battery 305 as illustrated, although coupling 320 may be flexible and when incorporated within a device, may be moveable within a particular volume. Module 310, however, may be fully contained within the lateral width of the battery 305 in some embodiments. Module 310 may include one or more components including a circuit board 312 as well as a mold 314, which may include a single mold extending about the circuit board 312, as well as multiple portions in embodiments including discrete portions separately coupled on opposite sides of the circuit board 312. Coupling 320 may extend from the circuit board and be folded in one or more ways to position the connector 315 beneath the module 310. Of course, the position may be relative to the orientation of the battery system 300.

For example, battery 305 may have a first surface 307, which may be a surface adjacent to or facing module 310 in embodiments. Battery 305 may include a second surface 308 from which flange 306 may extend, and battery 305 may include a third surface 309 opposite second surface 308. First surface 307 may extend between and be partially or substantially normal to second surface 308 and third surface 309. By substantially is meant that angles may be less than or greater than perfectly perpendicular, which may account for curved surfaces as well as machining or fabrication tolerances. As previously noted, the housing of battery 305 may include a recessed can on which a lid is disposed, and thus in some embodiments first surface 307 and third surface 309 may be part of a continuous structure and may not have a discrete intersection. Similarly, flange 306 may be formed by material extending from the first surface as well as material defining the second surface, such as where first surface 307 may define a lip at an edge along which a lid, being the second surface, may be coupled. Regardless, the flange may extend in line with the second surface in embodiments.

Returning to coupling 320, when folded, connector 315 may be positioned at least partially in line with module 310 along first surface 307 of battery 305, although the connector 315 may be positioned at least partially between the module 310 and the third surface 309, as well as at least partially extending past third surface 309 in a direction at least partially along or parallel with the first surface 307 of the battery between the second and third surfaces. The coupling may be a number of flexible couplings including printed circuit board, flex board, or other circuit materials or cables that may allow electrical transmission as well as communication transmission to and from the individual circuit modules or the battery to a system board.

The coupling 320 may be folded in multiple ways depending on an electronic device configuration to properly position the connector. For example, in one non-limiting embodiment illustrated, coupling 320 may extend from circuit board 312 in a direction substantially parallel with first surface 307 towards second surface 308. Again, by substantially is meant the components may not be perfectly parallel with one another, but may generally run in a similar direction, and is to be understood in the same manner throughout the present disclosure. Coupling 320 may include a first fold outward away from battery 305 and over at least a portion of mold 314, which may return the coupling about 180°. The coupling may then include an arcuate section extending the coupling in plane towards an edge of the module along a longitudinal direction of the module. A second fold may extend the coupling back across the module and towards the first surface of the battery 305, and return the coupling about 90°. A second arcuate section may extend the coupling in plane in a direction towards the third surface 309 of the battery 305. A third fold may extend the coupling back along the battery 305 in a direction parallel to the third surface 309, which may return the coupling about 90°, and which may position the distal end of the coupling with the connector in proper location for connection with a system board or other component. It is to be understood that coupling 320 may take a variety of forms to properly position a connector for coupling depending on location of the component to be connected, and FIG. 3 illustrates merely one example of a coupling 320 configuration.

Adhesive 325 may be included to at least partially hold module 310 against battery 305. Adhesive 325 may be one of several adhesives incorporated to maintain module 310 with battery 305, as will be described below in more detail below.

Figure 4:
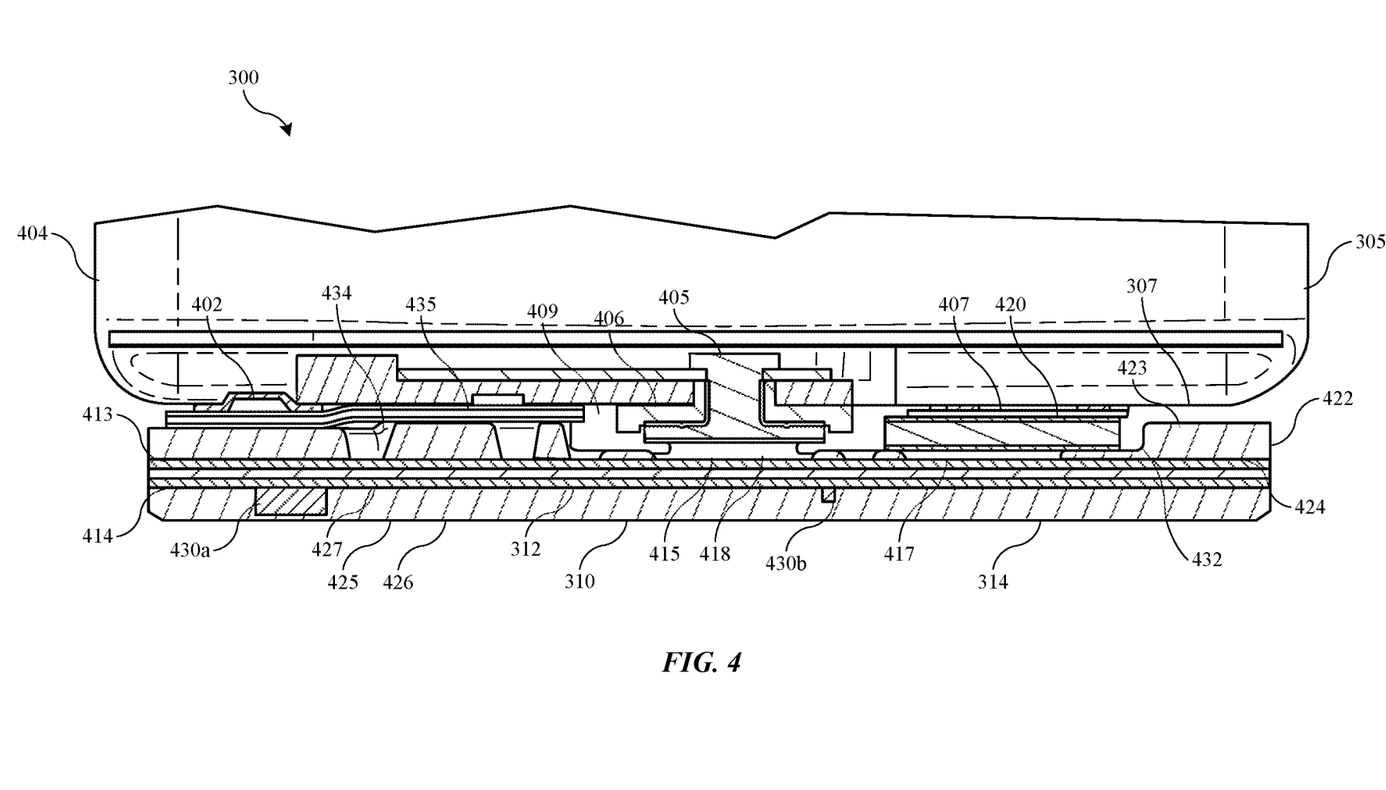
FIG. 4 shows a schematic, cross-sectional, partial top view of a battery system according to some embodiments of the present technology.

FIG. 4 shows a schematic, cross-sectional, partial, top view of battery system 300 according to some embodiments of the present technology. As shown in FIG. 4, battery system 300 may include some or all of the components, characteristics, or aspects of battery system 300 described above. For example, battery system 300 in this view shows battery 305 and module 310. Additional aspects of both the battery 305 and module 310 are shown including multiple locations for electrical and or mechanical coupling of the components.

Battery 305 may include one or more terminals extending from battery 305 and providing electrical access to the battery cell. Additionally, a port 402 may be positioned along the first surface 307 of battery 305. Port 402 may be a fill port or other access to battery 305, and may be sealed in embodiments. Port 402 may be positioned proximate a lateral edge of battery 305 or first surface 307 of battery 305, such as near or adjacent a fourth surface 404 of battery 305 that may intersect or extend into a lateral edge of first surface 307 of battery 305.

A first electrode terminal 405 and a second electrode terminal 407 may extend from or be accessible along first surface 307 of battery 305. In some embodiments each of the first electrode terminal and the second electrode terminal may extend from the first surface 307 of battery 305 to the same position. In some embodiments, such as illustrated, first electrode terminal 405 may extend outward from first surface 307 further than second electrode terminal 407. As previously noted, in some embodiments the housing of battery 305 may be conductive and may be at the potential of one of the electrodes, such as the anode terminal, although the housing may also be maintained at cathode potential. The second electrode terminal 407 may represent the electrode terminal of the potential at which the housing is maintained. Accordingly, the terminal may be a contact, tab, or access of the housing. The first electrode terminal 405, however, may be at the opposite potential of the housing and/or the second electrode terminal 407, and may be maintained or electrically isolated from the rest of the housing. For example, first electrode terminal 405 may be the cathode terminal, although the terminal may also be maintained at anode potential in other embodiments.

To isolate the first electrode terminal 405 from the rest of the housing, a spacer 406 may extend circumferentially about the first electrode terminal through the housing of battery 305, including along the first surface 307 of battery 305. Consequently, first electrode terminal 405 may extend further than second electrode terminal 407. In order to limit the extensions of the module to accommodate this configuration, in some embodiments the module 310 may include different conductive tabs to accommodate the spatial offset of the two terminals. In some embodiments, an additional material 409 may further insulate the first electrode terminal. For example, an additional electrically insulative material may be used, such as nylon, or more rigid materials may be included such as aramid polymer materials, including Nomex, or any other electrically insulative material may be used, for example.

Module 310 may be electrically coupled with battery 305 at both the first electrode terminal and the second electrode terminal. As noted, module 310 may include a circuit board 312 as well as a mold. The circuit board 312 may be characterized by a first surface 413 and a second surface 414 opposite the first surface. A first contact 415 and a second contact 417 may be included on first surface 413 to electrically couple the module with the battery 305. Extending between and electrically coupling the first contact 415 with the first electrode terminal 405 may be a first conductive tab 418. Extending between and electrically coupling the second contact 417 with the second electrode terminal 407 may be a second conductive tab 420. These connections will be described in further detail below.

Module 310 may also include a mold 314 which may extend about the circuit board 312 in embodiments. In some embodiments as illustrated, mold 314 may include two discrete molds extending separately from the first surface and second surface of the circuit board. For example, first mold 422 may include a first surface 423 and a second surface 424 coupled with the first surface 413 of the circuit board. First mold 422 may extend from the circuit board 312 towards the battery 305 or towards the first surface 307 of battery 305 in some embodiments. Second mold 425 may include a first surface 426 and a second surface 427 coupled with the second surface 414 of the circuit board. Circuit board 312 may include one or more electronic devices 430 or components extending from either or both of the first surface 413 or the second surface 414 of the circuit board, and which are encapsulated by one or both of the first mold 422 and the second mold 425. For example, electronic device 430a and 430b are illustrated as extending from the second surface 414 of circuit board 312. The devices 430 are encapsulated by second mold 425, which may provide protection for the electronic devices.

First mold 422 may be characterized by one or more features to accommodate the components of the battery 305 as well as the coupling of the module 310 with the battery 305. For example, first mold 422 may define a recess 432 in first surface 423 of the first mold 422. Recess 432 may extend partially along first surface 423 of the first mold 422, and may extend along a portion of first mold 422 proximate or facing the first electrode terminal 405 and/or the second electrode terminal 407 of battery 305. First contact 415 and second contact 417 may be located or accessed through recess 432. As illustrated, recess 432 may allow closer coupling of the module 310 with the battery 305 by creating a void space within first mold 422 and in which the first electrode terminal may extend. First electrode terminal 405 may extend from an interior of battery 305 to an exterior location, and may be electrically isolated as well as physically isolated from contacting battery 305 housing with spacer 406. The exterior portion of first electrode terminal 405 may be at least partially positioned within recess 432 or the space created by recess 432.

First mold 422 may also include a feature to accommodate port 402. As illustrated, port 402 may in some embodiments at least partially extend beyond first surface 307 of battery 305. First mold 422 may define a recessed ledge 434 in the first surface 423 of the first mold. Recessed ledge 434 may be a recess similar to recess 432 in embodiments, or may be a recessed ledge as illustrated, which may extend the recession from the defined recessed ledge 434 towards a lateral edge of the first mold proximate the port. By incorporating features such as recess 432 and recessed ledge 434, module 310 may better accommodate an uneven profile of components along first surface 307 of battery 305, while maintaining a substantially even exterior profile, such as along first surface 426 of second mold 425.

As noted above, multiple adhesives may be included both for component protection and positioning. In addition to external adhesive 325 described previously, one or more adhesives may be included between the module 310 and battery 305 in embodiments. A first adhesive 435 may be positioned between the first surface 307 of the battery 305 and the first mold 422 in embodiments. As illustrated, first adhesive 435 may couple first mold 422 with at least a portion of first surface 307 of battery 305. First adhesive 435 may extend directly across port 402 in some embodiments. First adhesive 435 may also extend across recessed ledge 434, and may extend towards, up to, or at least partially beyond a location of first mold 422 where recess 432 is defined in first surface 423 of the first mold.

Figure 5:
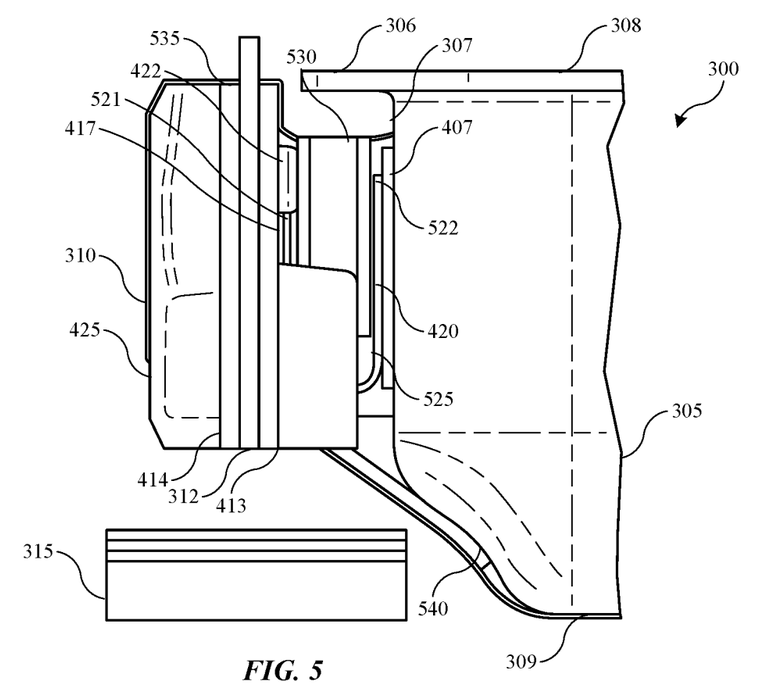
FIG. 5 shows a schematic partial side elevation view of a battery system according to some embodiments of the present technology.

Turning to FIG. 5 is shown a schematic partial side elevation view of battery system 300 according to some embodiments of the present technology. As shown in FIG. 5, battery system 300 may include some or all of the components, characteristics, or aspects of battery system 300 described previously. For example, battery system 300 in this view shows battery 305 and module 310. Additional aspects of both the battery 305 and module 310 are shown including coupling between the second electrode terminal 407 and the second conductive tab 420 of module 310.

Second electrode terminal 407 may be substantially flush or even slightly recessed from first surface 307 of battery 305. Because module 310 may be positioned to accommodate the extended portion of first electrode terminal 405, a gap may exist in some embodiments between the second contact 417 on module 310 and the second electrode terminal 407. Accordingly, in some embodiments, second conductive tab 420 may extend across the gap. Second conductive tab 420 may be coupled to module 310 at a first end 521 of second conductive tab 420. The coupling may be by a weld, conductive adhesive, or other conductive coupling allowing or facilitating electrical transfer between second conductive tab 420 and second contact 417 of module 310. Second conductive tab 420 may extend from first end 521 along a length of the conductive tab to a distal or second end 522. Second end 522 may be coupled with second electrode terminal 407, and may also be coupled via weld, adhesive, or any other coupling allowing electrical communication between the components. From first end 521, second conductive tab 420 may extend relatively or substantially parallel to a plane of the second contact 417 and/or the second electrode terminal 407. Second end 522 may be fixedly coupled with second electrode terminal 407, and may also be relatively or substantially parallel to a plane of the second contact 417 and/or the second electrode terminal 407.

From first end 521 to second end 522, second conductive tab 420 may be characterized by an amount of curvature or by a number of bends to at least partially define a volume 525 bounded between the first end 521 and the second end 522 of the second conductive tab 420. Second conductive tab 420 may be a relatively thin conductive material, and thus, may have limited rigidity against compression or deformation within an electrode device. In some embodiments, a spacer 530 may be seated or positioned in the volume between the first end 521 and the second end 522 of the second conductive tab 420. The spacer may be formed of an insulative material, and may include adhesive on opposite sides of the spacer material. Accordingly, the spacer 530 may be adhered to both the first end 521 of the second conductive tab 420 as well as the second end 522 of the second conductive tab 420 on surfaces opposite surfaces coupled respectively with the second contact 417 and the second electrode terminal 407. Spacer 530 may extend laterally to a width similar to, less than, or greater than the conductive tab, including either end of the conductive tab as will be described further below.

FIG. 5 also illustrates features of the first mold 422 and the second mold 425 as coupled with the circuit board 312. In some embodiments, circuit board 312 extends substantially parallel to the first surface 307 of battery 305. Circuit board 312 may extend towards or to, or substantially even with, flange 306, which as noted previously may be a planar extension from second surface 308, and may extend proud of first surface 307 of battery 305. A gap may be maintained between an exterior edge of flange 306 and first surface 413 of circuit board 312. Second mold 425, which may be coupled with second surface 414 of circuit board 312, may extend fully along circuit board 312 parallel to first surface 307 in a direction extending towards surface 308. Second mold 425 may extend to edge 535 of circuit board 312, which may be an outer edge of the circuit board proximate, adjacent, or in line with, flange 306.

First mold 422 may not extend fully along first surface 413 of circuit board 312 to prevent contact with flange 306 in embodiments. As illustrated, first mold 422 may be offset from edge 535 of circuit board 312 in a direction parallel to the first surface 307 of battery 305. First mold 422 may extend past the flange towards the battery in some embodiments, while limiting or being free of any contact with flange 306. For example, an exterior edge of flange 306 may define a plane parallel to the first surface 307 of battery 305, and first mold 422 may extend through this plane towards first surface 307 of battery 305.

FIG. 5 further illustrates an indentation 540 along battery 305 along the intersection of first surface 307 and third surface 309. As noted above, the housing of battery 305 may include a bowl-and-lid type housing, and thus an at least partial continuity may exist between first surface 307 and third surface 309, which may otherwise extend normal to first surface 307. Where the surfaces intersect, an indentation 540 may be formed inward towards an internal battery cell of the battery 305. The indentation 540 may at least partially accommodate connector 315, or the associated connector or component with which connector 315 is coupled.

Figure 6:
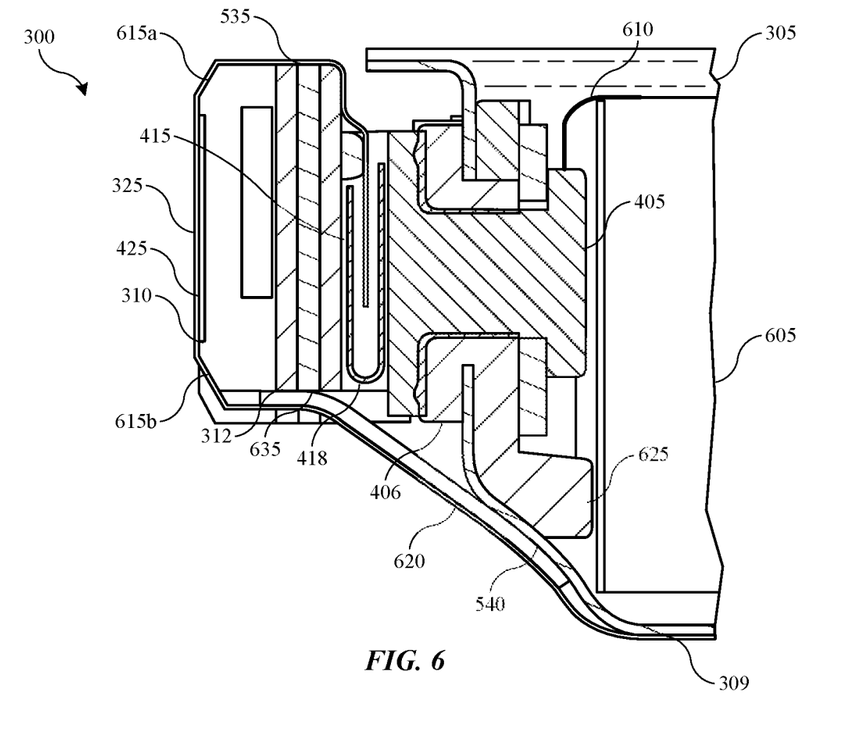
FIG. 6 shows a schematic partial cross-sectional elevation view along line A-A of FIG. 3 of a battery system according to some embodiments of the present technology.

FIG. 6 shows a schematic partial, cross-sectional, elevation view along line A-A of FIG. 3 of battery system 300 according to some embodiments of the present technology. As shown in FIG. 6, battery system 300 may include some or all of the components, characteristics, or aspects of battery system 300 described previously. For example, battery system 300 in this view shows battery 305 and module 310. Additional aspects of both the battery 305 and module 310 are shown including coupling between the first electrode terminal 405 and the first conductive tab 418 of module 310.

Within battery 305 is cell material 605, which may be one or more battery cells as described previously. A conductive extension 610 may electrically couple one or more current collectors or electrodes with first electrode terminal 405. For example, in embodiments where first electrode terminal is a cathode terminal, conductive extension 610 may electrically couple cathode materials of cell material 605 with first electrode terminal 405. Spacer 406 may electrically insulate first electrode terminal 405 from the rest of the housing of battery 305 in embodiments where the housing may be at the opposite electrode potential. Both spacer 406 and first electrode terminal 405 may extend through the housing of battery 305. First conductive tab 418 may extend between first contact 415 and the first electrode terminal 405. First conductive tab 418 may be folded in some embodiments. The fold may facilitate connections in some embodiments. For example, the first conductive tab 418 may be coupled with first contact 415 by any of the coupling described previously. The first conductive tab 418 may be at least partially folded in some embodiments, and coupled with the first electrode terminal by similar coupling mechanisms. After the first conductive tab and second conductive tab have both been connected with battery 305, the module may be rotated into position forming the bend or fold in first conductive tab 418.

Additional features of adhesive 325 are also illustrated in FIG. 6. Adhesive 325 may extend about the module 310, contacting both the first conductive tab 418 and the battery 305. A first end of adhesive 325 may extend within the fold of conductive tab 418, and contact a first end of conductive tab 418 coupled with first contact 415. The adhesive may then extend around edge 535 of circuit board 312 and about second mold 425. The adhesive may then extend along indentation 540 and to third surface 309 of battery 305. Adhesive 325, along with any of the adhesives described elsewhere, may be any number of adhesives, and in some embodiments may provide environmental protection and/or insulation. While in some embodiments the adhesives are water resistant, in other embodiments the adhesives may be configured to simply protect the components from any environmental contaminants including dust, lint, or other particulates, and insulate the components against contact. Additionally, the adhesives may be configured to maintain a location of the module 310 relative to the battery 305. The adhesives may be or include a polymer backing with an applied adhesive. The polymer may be any number of polymers that provide electrical resistivity, structural resiliency, hydrophobicity, or flexibility. For example, in some embodiments a polyimide-backed tape may be used, which may afford a thin film tape that may be flexible to accommodate the topography of module 310, while limiting gaps or spacing about the module. Although described as a tape, additional adhesives, encapsulants, and enclosures may be utilized to provide a similar protection to components of the module 310, and are similarly encompassed by the present technology.

Second mold 425 may be characterized by chamfered corners 615 on one or more edges of the mold material in some embodiments. A first corner 615a may be chamfered and/or a second corner 615b may be chamfered. The chamfered edges may provide an additional reduction in the outer envelope or volume consumed by the module 310. An additional insulation 620 or spacer may be included between the adhesive 325 and a second edge 635 of circuit board 312, which may also extend to indentation 540. The insulation 620 may accommodate any surface irregularities or external components, including the connector, that may puncture the adhesive, as well as assist in accommodating the topography of the battery 305.

The internal view of battery 305 additionally illustrates the limited impact of indentation 540 on the battery cell material 605. Because of the additional internal components proximate first surface 307 of battery 305, the indentation may be produced to limit interference with the battery cell material 605. For example, an additional internal spacer 625 may be formed to contour to the indentation, and the indentation may be formed to end proximate a location of third surface 309 where battery cell material 605 may reside. Accordingly, battery 305 may provide a configuration that limits impact with connector 315 as described above, while also limiting or preventing any reduction in available volume for battery cell material 605.

Figure 7:
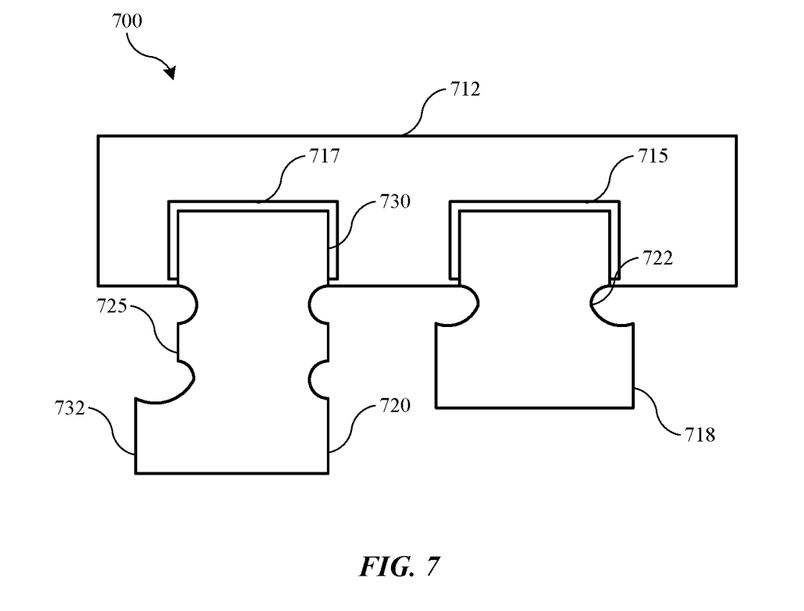
FIG. 7 shows a schematic view of a module including conductive tabs according to some embodiments of the present technology.

FIG. 7 shows a schematic view of a module 700 including conductive tabs according to some embodiments of the present technology. Module 700 illustrates exemplary conductive tabs according to some embodiments of the present technology. It is to be understood that any number of conductive materials or tab geometries may be used in the present technology, and thus the example of module 700 is not intended to limit the present technology. Module 700 may include some or any of the components of module 310 described above, and may include a circuit board 712. Circuit board 712 may include a first contact 715 and a second contact 717, which may be electrically coupled with electrode terminals on a battery as previously described. A first conductive tab 718 may be coupled with and extend from first contact 715, and a second conductive tab 720 may be coupled with and extend from second contact 717.

The conductive tabs may include a variety of geometries providing a surface for coupling with electrode tabs of a battery. Although conductive tabs 718 and 720 may be rectangular, in some embodiments the conductive tabs may be characterized by any number of geometries that may be shaped to accommodate contacts or terminals of virtually any shape. A first end and second end of each conductive tab may be or form a weld tab, which may provide a landing space and surface to which electrode tabs may be welded, bonded, or otherwise adhered to an associated contact or terminal. The conductive tabs may also include an extension portion between the first end and second ends of the conductive tabs.

Extension portions 722, 725 may include one or more notches, regions, thicknesses, or widths along a length of the extension portion. The extension portions may be shaped or configured to facilitate bending, folding, or manipulation of the conductive tabs to improve a contact surface position for the weld tab, as well as to limit sheering or other forces on the conductive tab. For example, extension portion 725 of conductive tab 720 may include sets of notches to facilitate bending, as well as an interior region between the sets of notches, which may extend across a gap length between a contact and terminal as described previously. A spacer may be seated on or within this interior region, such as to produce second conductive tab 420 described previously. Additionally, the end portions of the conductive tabs may be of different shapes or sizes in embodiments. For example, although the contacts may be of similar size, a battery terminal may be larger or smaller than a circuit board contact in some embodiments. Accordingly, a first end 730 of a conductive tab 720, may be sized to accommodate a contact 717 of the circuit board, while a second end 732 of the conductive tab 720, may be sized to accommodate an electrode terminal of a battery. Hence, any number of variations may be provided by the present technology to accommodate both modules and batteries.

Figure 8:
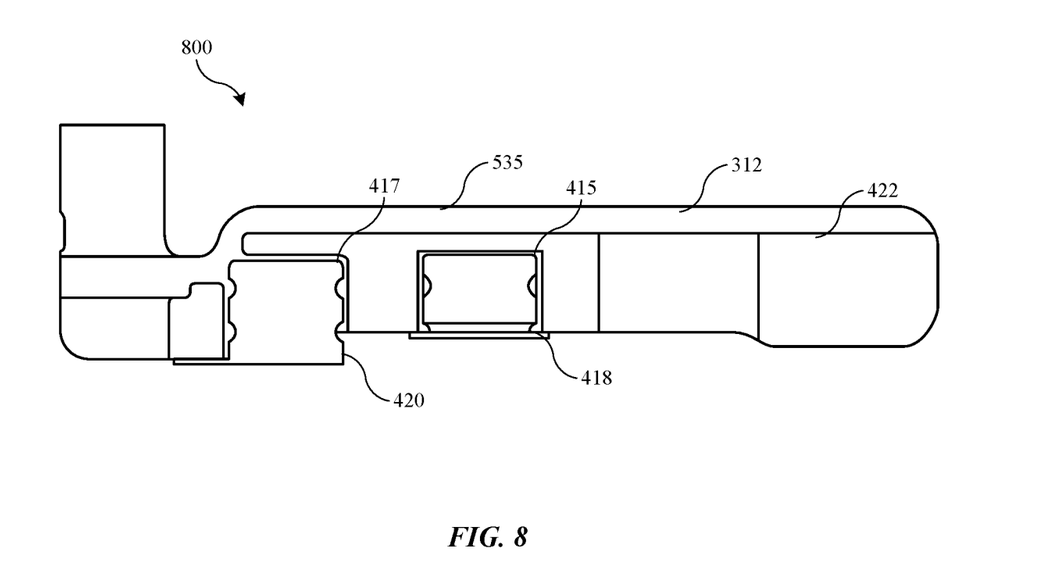
FIG. 8 shows a schematic elevation view of a module according to some embodiments of the present technology.

FIG. 8 shows a schematic elevation view of a module 800 according to some embodiments of the present technology. Module 800 may include any of the features or aspects of module 310 described elsewhere, and may illustrate a view of module 310 separated from battery 305, for example. Module 800 may illustrate how a first mold may be offset from an edge of the circuit board to accommodate a flange protruding from the battery towards the circuit board. Module 800 illustrates a first contact 415 and a second contact 417 exposed on circuit board 312. First mold 422 may extend about these contacts to encapsulate or otherwise protect circuit board 312 as well as components or devices on circuit board 312. A first conductive tab 418 may be coupled with first contact 415, and a second conductive tab 420 may be coupled with second contact 417. The conductive tabs are illustrated in partially folded position, or in L-shaped configurations that may facilitate connection with a battery. First mold 422 may extend about the contacts, and may extend towards an edge 535 of circuit board 312, while maintaining an amount of offset to limit or prevent interaction between first mold 422 and a flange of the battery to which the module 800 may be coupled. The offset may be sized to accommodate a thickness of the flange as well as the manufacturing tolerances associated with module coupling.

Battery systems according to embodiments of the present technology may provide a limited footprint extension for a control module associated with a battery. Because many electronic devices have limited volume for a battery, the present technology allows more of this volume to be used for battery cell material, which may increase or maintain battery capacity in smaller devices. Additionally, while many battery configurations are characterized by uneven external topographies, modules according to some embodiments of the present technology may maintain a substantially even external surface by providing internal mold and component configurations that accommodate the uneven battery characteristics.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery system comprising:
   a battery, wherein the battery includes a first electrode terminal and a second electrode terminal accessible along a first battery surface of the battery;
   a module electrically coupled with the battery, the module comprising:
      a first mold extending toward the battery, wherein the first mold comprises a first mold surface and a second mold surface opposite the first mold surface, and wherein the first mold defines a recess along the first mold surface proximate the first electrode terminal and the second electrode terminal,
      a first conductive tab electrically coupling the module with the first electrode terminal, wherein the first electrode terminal is at least partially positioned within a space defined by the recess defined by the first mold, and
      a second conductive tab electrically coupling the module with the second electrode terminal; and
   a circuit board comprising a first circuit board surface and a second circuit board surface opposite the first circuit board surface, wherein the second mold surface is coupled with the first circuit board surface, and wherein the module further comprises a second mold coupled with the second circuit board surface.

2. The battery system of claim 1, wherein the battery further comprises a port positioned proximate a lateral edge of the first battery surface of the battery, wherein the first mold defines a recessed ledge in the first mold surface of the first mold extending towards a lateral edge of the first mold proximate the port.

3. The battery system of claim 2, further comprising a first adhesive positioned between the port and the first mold, wherein the first adhesive extends across the recessed ledge.

4. The battery system of claim 1, wherein the second conductive tab at least partially defines a volume between a first end of the second conductive tab coupled with the module and a second end of the second conductive tab coupled with the second electrode terminal.

5. The battery system of claim 4, further comprising a spacer including a second adhesive seated in the volume between the first end of the second conductive tab and the second end of the second conductive tab.

6. The battery system of claim 1, wherein an electronic device extends from the second circuit board surface of the circuit board opposite the first circuit board surface of the circuit board, and wherein the second mold encapsulates the electronic device.

7. The battery system of claim 6, wherein the circuit board extends substantially parallel to the first battery surface of the battery to a location substantially in line with a flange of a second battery surface of the battery normal to the first battery surface of the battery.

8. The battery system of claim 7, wherein the second mold extends along the circuit board to an edge of the circuit board proximate the flange, and wherein the first mold extends along the circuit board to a position offset from the edge of the circuit board in a direction parallel to the first battery surface of the battery.

9. The battery system of claim 1, further comprising a flexible coupling extending from the module and comprising a board-to-board connector at a distal end of the flexible coupling.

10. A battery system comprising:
    a battery characterized by a first surface, a second surface, and a third surface, wherein the second surface and the third surface are substantially parallel to one another, wherein the first surface of the battery extends between the second surface and the third surface, and wherein the first surface comprises a first electrode terminal and a second electrode terminal;
    a module coupled with the first surface of the battery and comprising a circuit board characterized by a first surface and a second surface opposite the first surface, wherein the module comprises:
       a first mold extending from the first surface of the circuit board toward the battery,
       a second mold extending from the second surface of the circuit board, a first conductive tab extending from the module to the first electrode terminal, and a second conductive tab extending from the module to the second electrode terminal; and a flexible coupling extending from the circuit board parallel to the first surface of the battery in a direction towards the second surface of the battery.

11. The battery system of claim 10, wherein the first mold defines a recess along a first surface of the first mold proximate the first electrode terminal, wherein the first surface of the first mold is opposite a second surface of the first mold coupled with the first surface of the circuit board, wherein the first electrode terminal of the battery extends from the first surface of the battery, and wherein the first electrode terminal is at least partially positioned within the recess defined by the first mold.

12. The battery system of claim 10, wherein the second conductive tab at least partially defines a volume between a first end of the second conductive tab coupled with the module and a second end of the second conductive tab coupled with the second electrode terminal, and wherein the battery system further comprises a spacer including an adhesive seated in the volume between the first end of the second conductive tab and the second end of the second conductive tab.

13. The battery system of claim 10, wherein the second surface of the battery comprises a flange extending proud of an intersection of the first surface of the battery and the second surface of the battery, and wherein the circuit board of the module extends substantially parallel to the first surface of the battery to a location substantially in line with the flange.

14. The battery system of claim 13, wherein the second mold extends along the second surface of the circuit board to an edge of the circuit board proximate the flange, wherein the first mold extends along the circuit board to a position offset from the edge of the circuit board in a direction parallel to the first surface of the battery, and wherein the first mold extends towards the first surface of the battery beyond a plane parallel to the first surface of the battery and defined by an external edge of the flange.

15. The battery system of claim 10, wherein the second mold defines a chamfer along an outer edge of the second mold at a location along the second mold proximate the first electrode terminal of the battery.

16. The battery system of claim 10, wherein the battery defines an arcuate indentation along an intersection of the first surface of the battery and the third surface of the battery.

17. The battery system of claim 10, wherein the flexible coupling comprises a connector at a distal end of the flexible coupling, and wherein the flexible coupling is folded about the second mold to position the connector at least partially between the module and the third surface of the battery in a direction along the first surface of the battery.

18. The battery system of claim 10, wherein the battery further comprises a port positioned proximate a lateral edge of the first surface of the battery, wherein the first mold defines a recessed ledge in a first surface of the first mold extending towards a lateral edge of the first mold proximate the port, and wherein the module further comprises a first adhesive positioned between the port and the first mold, and wherein the first adhesive extends across the recessed ledge of the first mold.

19. A battery system comprising:

a battery, wherein the battery includes a first electrode terminal, a second electrode terminal, and a port accessible along a first surface of the battery;

a module electrically coupled with the battery, the module comprising:

a mold extending toward the battery, wherein the mold defines a recessed ledge in a first surface of the mold extending towards a lateral edge of the mold proximate the port, a first conductive tab electrically coupling the module with the first electrode terminal, and a second conductive tab electrically coupling the module with the second electrode terminal, wherein the second conductive tab at least partially defines a volume between a first end of the second conductive tab coupled with the module and a second end of the second conductive tab coupled with the second electrode terminal;

a flexible coupling extending from the module parallel to the first surface of the battery;

a first adhesive positioned between the port and the mold, wherein the first adhesive extends across the recessed ledge of the mold; and a spacer including a second adhesive seated in the volume between the first end of the second conductive tab and the second end of the second conductive tab.

* * * * *